United States Patent

Dillon, Jr. et al.

[15] 3,639,855
[45] Feb. 1, 1972

[54] LASER DEVICES

[72] Inventors: Joseph F. Dillon, Jr., Morris Township, Morris County; Charles G. B. Garrett, Morristown, both of N.J.

[73] Assignee: Bell Telephone Laboratories, Incorporated, Murray Hill, Berkeley Heights, N.J.

[22] Filed: Dec. 19, 1969

[21] Appl. No.: 882,773

Related U.S. Application Data

[63] Continuation of Ser. No. 577,010, Sept. 2, 1966.

[52] U.S. Cl..............................331/94.5, 250/199, 350/151
[51] Int. Cl........................H01s 3/14, H01s 3/05, G02f 1/22
[58] Field of Search....................331/94.5; 250/199; 350/151

[56] References Cited

UNITED STATES PATENTS 3,406,354  10/1968  Dumanchin...........................331/94.5
3,430,158  2/1969   Fox et al..............................331/94.5
3,478,277  11/1969  Giordmaine et al..................331/94.5
3,526,850  9/1970   Dillon, Jr. et al.....................331/94.5

OTHER PUBLICATIONS

Zitter et al., J. Applied Physics, vol. 37, No. 3, 1 Mar. '66, pp. 1089-1090.

*Primary Examiner*—Ronald L. Wibert
*Assistant Examiner*—R. J. Webster
*Attorney*—R. J. Guenther and Edwin B. Cane

[57] ABSTRACT

A magnetically saturable laser rod (e.g. doped YIG) has one end cut at Brewster's angle and is included in an optical cavity. Modulation is accomplished, via Faraday's effect, by varying the direction of the rod magnetization and by using the Brewster's angle face as the polarization sensitive element in the cavity. Light reflected out of the cavity at the Brewster's angle face can be detected and used in a feedback sense to control the applied magnetic field.

1 Claims, 1 Drawing Figure

PATENTED FEB 1 1972
3,639,855
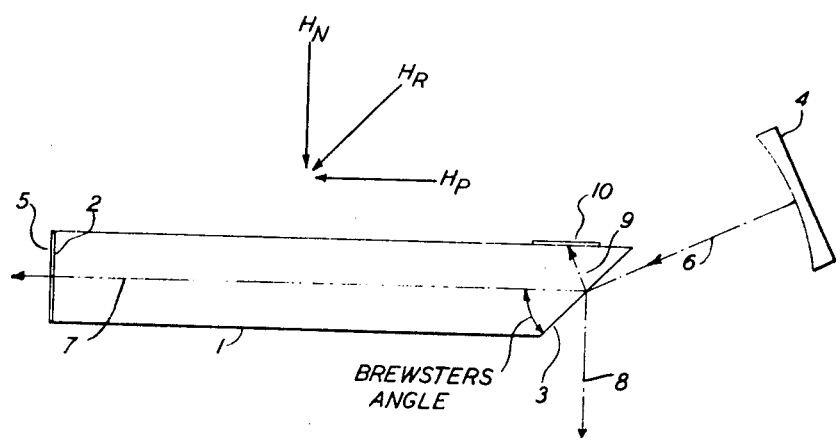
INVENTORS J.F. DILLON, JR.
C.G.B. GARRETT
BY George S. Indig
ATTORNEY

LASER DEVICES

This is a continuation of application Ser. No. 577,010 filed Sept. 2, 1966 and relates to magnetic laser devices wherein the magnetic host contains at least one Brewster's angle facet, and in which laser beam modulation is conducted through the influence of a controlled applied magnetic field.

Recently, laser beams have been produced from crystalline bodies of saturable magnetic materials of the garnet structure. For example, yttrium-iron garnet (YIG) properly doped with a selected emitting ion such as holmium, thulium, or erbium, is an effective magnetic host material for lasing. Saturable magnetic host materials other than YIG, in combination with other various rare-earth emitting ions, are also excellent systems for lasing.

With the advent of saturable magnetic host materials, there is the possibility of laser beam modulation under the influence of a magnetic field. Modulation by the use of an external magnetic field can be carried out in YIG crystals in various ways, so as to lead to modulation of frequency, amplitude, polarization, or direction. Such modulation can be in response to information either of a digital or of an analog character.

The present invention contemplates an optical cavity containing a crystal of magnetically saturated YIG or other suitable magnetic crystal, at least one mirror of the cavity being detached from the crystal and placed some distance from the end face thereof, said end face being cut at Brewster's angle and means being provided for applying an external magnetic field. The crystal of magnetically saturated YIG or other suitable material serves both to provide the optical gain necessary to achieve optical oscillation and a variable "loss" associated with a reflected beam at the Brewster's angle face. The amount of this reflection, and the precise character of the oscillation, is determined by the orientation of the magnetization of the crystal, which itself is determined by the externally applied field. Thus, under the influence of the applied magnetic field and by means of the Brewster angle facet the laser beam is modulated in accordance with some intelligence. Moreover, energy reflected by the Brewster facet provides feedback information which may be used to bring the laser system to oscillate in one of several alternative operating states.

Further description of the invention will be facilitated by reference to the drawing, in which:

FIG. 1 is a schematic plan representation of a magnetically saturable laser, with a facet cut at the Brewster's angle, so arranged as to be under the influence of an external magnetic field.

In FIG. 1, which is one possible embodiment of the present invention, magnetically saturable crystal 1 is constructed with facet 2 substantially at 90° to the optic axis, and with a facet 3 at Brewster's angle to the axis. As an oscillator device, reflecting means 4 is used in conjunction with reflection coating 5, affixed to facet 2, to support the oscillatory mode of laser beam 6. Reflection coating 5 need not be a total-reflection coating, but may be a partial-reflection coating to allow beam 7 to be transmitted out through facet 2. Moreover, facet 2 need not be coated at all since oscillation can be maintained by allowing beam 7 to be reflected from external reflecting means, not shown.

As the laser beam 6 impinges on the Brewster facet 3, components of light parallel to the incident plane are transmitted through the Brewster facet along the optic axis either to be totally or partially reflected in accordance with a total-reflection or partial-reflection coating 5. Some components of laser beam 6 that are not in the incident plane are reflected by the Brewster facet 3 as beams 8 and 9, where, preferably, beam 9 is absorbed by black body 10.

As an oscillator device, the magnetic crystal 1 would be one capable of supporting lasing with an appropriate pump source (not shown) and dopant ions. By way of example only, and not as a limitation of the invention, the YIG system alluded to in the introductory paragraph of this specification, would be a suitable crystal system for the device herein disclosed and claimed.

Modulation of the laser beam occurs in accordance with the Faraday rotation phenomena. When an external applied magnetic field $H_N$, of sufficient magnitude to magnetically saturate the crystal, is so positioned to produce an internal magnetization in a direction orthogonal to the internal laser beam, no Faraday rotation will occur. The laser will operate at some threshold and all the energy in the system will be of that sense of linear polarization passed by the Brewster angle, that is, the linear polarization with the electric vector in the plane of incidence.

However, still referring to FIG. 1, an external magnetic field, $H_R$, may be produced by the vector addition of the normal saturation magnetic field, $H_N$, and a parallel magnetic field, $H_P$, so that the internal magnetization of the crystal lies at some angle to the internal beam direction. If $H_R$ deviates in some degree from the normal position, so that there is a component of internal magnetization in the beam direction, the laser acquires new normal modes of oscillation. These new normal modes are either elliptically or linearly polarized, but even where they are linearly polarized, the electric vector is no longer in the plane of incidence of the Brewster face. There is, therefore, regardless of whether the conditions are such as to cause the normal modes to be elliptically or linearly polarized, a component of the electric vector perpendicular to the said plane of incidence. Therefore, there is now some reflection loss at the Brewster face, such loss giving rise to the radiation of laser energy into reflected beams 8 and 9. This has two effects. Firstly, beams 8 and 9 now compete with beams 6 and 7; as the power radiated in beams 8 and 9 rises, that in beams 6 and 7 falls. Secondly, since the total rate of loss has increased, so also has the threshold necessary for oscillation. If the orientation of $H_R$ is so chosen that the loss into beams 8 and 9 exceeds some certain value, such that threshold reaches the operating pump level, oscillation will cease.

The utilization of a Brewster's angle facet allows for precise modulation or control over the operation of the active laser medium. This is accomplished, for example, by using the signal taken out of the system at the Brewster facet (beam 8) as feedback to provide information to a control device which, in accordance with such information, produces some desired change in the conditions under which the laser medium, that is, the magnetic host, is operating. This feedback concept for control of the laser system can be described further by reference to one possible embodiment as follows:

In one embodiment the magnetic field applied to the magnetic host is produced by coil windings around the host material. The current flowing through the coil windings determines the magnitude and direction of the magnetization in the host environment. One possible method of producing a net internal magnetization in the host environment is to producing a resultant magnetic direction from two orthogonal external magnetic fields, as shown earlier in FIG. 1. Thus, control over the magnitude of one or both of the orthogonal magnetic fields is a means of controlling the magnitude of the resultant magnetic vector. Since it is the resultant internal magnetization vector which determines the amount of Faraday rotation the beam experiences in the magnetic crystal, it is essential that control over the resultant magnetic vector be as precise as possible. This can be accomplished by allowing the laser light that is reflected by the Brewster facet to fall upon a photosensitive cell that is connected in circuit with the coil current. By sensing the amount of light that has been reflected, the photo cell can regulate the current flowing in the coil and bring the system to some desired operating state after sensing any undesired change in the reflected signal. Thus, the incorporation of a Brewster facet in the host magnetic crystal allows an observer to look at two aspects of the laser beam, one aspect being the product of the laser, that is, the desired output beam, and the other aspect being a reflected control beam which may either be discarded or altered in the course of the feedback necessary for control or for other observation.

Probably any commercial use of solid-state lasers would require some means for maintaining the active medium within a set range for several variables. Variation in laser operation owing to coil current variation could be compensated for in the manner described above; of course, the cause of the coil current variation could be compensated for in the manner described above; of course, the cause of the coil current variation could be due to any of several secondary variables, such as temperature or electrical resistance. Furthermore, since the threshold for lasing may be decreased by allowing the internal magnetization direction to approach the position normal to the internal beam from a less normal position, variation in the pump power level may be compensated for by adjustment of the threshold.

By incorporating Brewster's angle in the body of the magnetic host crystal as a crystal facet, as indicated in FIG. 1, there is the advantage, over a device in which a Brewster window is placed external to the active laser medium, that there is no insertion loss resulting from the addition of the Brewster window—an important consideration in low-energy systems.

Also, an internal Brewster facet avoids alignment difficulties which must be encountered when Brewster windows are employed externally to the active laser medium.

Due to the varied device possibilities that exist within the scope of the invention herein disclosed, it has been necessary to describe the invention in context of merely a few representative embodiments.

What is claimed is:

1. A modulable laser including a solid magnetically saturable active element having a facet at Brewster's angle to an internal laser beam, magnetic field means for establishing at least a saturation magnetization in said element, together with means for producing a component of said magnetization in the direction of said internal laser beam, such that said component induces Faraday rotation, and produces elliptical polarization of, in said internal beam, said rotation resulting in a reflected beam from said Brewster facet.

* * * * *